United States Patent [19]

Shibata et al.

[11] Patent Number: 4,849,382

[45] Date of Patent: Jul. 18, 1989

[54] LIGHTWEIGHT REFRACTORY AND PROCESS FOR PRODUCING THE SAME

[75] Inventors: Kenichi Shibata; Kouichi Kimura; Tomohiko Hara; Tatsuo Takagi, all of Kanagawa, Japan

[73] Assignee: Nichias Corporation, Tokyo, Japan

[21] Appl. No.: 157,254

[22] Filed: Feb. 18, 1988

[30] Foreign Application Priority Data

Feb. 18, 1987 [JP] Japan .................................. 62-33357

[51] Int. Cl.$^4$ ............................................. C04B 35/18
[52] U.S. Cl. ..................................... 501/95; 501/128; 501/133
[58] Field of Search .......................... 501/95, 128, 133

[56] References Cited

U.S. PATENT DOCUMENTS

| | | | |
|---|---|---|---|
| 3,231,401 | 6/1964 | Price et al. ........................... | 501/128 |
| 3,758,318 | 9/1973 | Farris et al. .......................... | 501/128 |
| 3,920,578 | 11/1975 | Yates ................................... | 501/133 |
| 4,384,046 | 5/1983 | Nakagami ............................ | 501/95 |

FOREIGN PATENT DOCUMENTS

| | | | |
|---|---|---|---|
| 0031370 | 8/1977 | Japan .................................... | 501/128 |
| 0089618 | 6/1982 | Japan .................................... | 501/95 |
| 59-88378 | 5/1984 | Japan . | |

*Primary Examiner*—William R. Dixon, Jr.
*Assistant Examiner*—Karl Group
*Attorney, Agent, or Firm*—Cushman, Darby & Cushman

[57] ABSTRACT

A lightweight refractory is disclosed which is a shaped porous body having refractory particles and aluminous short fibers bound to each other with mullite. The crtystalline structure of the refractory is chiefly composed of mullite and corundum. The mullite content is at least 12 mol % of the sum of mullite and corundum. The refractory is substantially free of free silica.

10 Claims, 3 Drawing Sheets

LIGHTWEIGHT REFRACTORY AND PROCESS FOR PRODUCING THE SAME

BACKGROUND OF THE INVENTION

The present invention relates to a lightweight refractory substance having improved heat resistance. More particularly, the present invention relates to a lightweight refractory that withstands repeated heating and cooling without damage and which is suitable for use not only in firing auxiliaries such as trays and plinths that are employed to support the members being fired to produce a variety of ceramic products such as ceramic electronic components (e.g. ceramic capacitors, alumina substrates, ferritic devices, thermistors and varistors), ceramic sliding materials and ordinary potteries, but also in heat-shielding plates and supports for heating elements used in various ceramic furnaces.

The firing auxiliaries and ceramic furnace components mentioned above must exhibit not only high enough heat resistance to withstand repeated heating and cooling cycles but also varying degrees of mechanical strength that suit specific uses. At the same time, it is desired that they display low levels of heat storage per unit of volume and are lightweight in order that energy costs can be reduced and production rates raised by reducing the level of thermal energy consumed during furnace operations and shortening the time required to achieve heating and cooling. In particular, firing auxiliaries are strongly desired to be lightweight for the specific purpose of facilitating conveyance and other aspects of handling.

A lightweight refractory that has been developed to meet these demands is described in Unexamined Published Japanese Patent Application No. 88378/84. This refractory is produced by adding 0.5-10 parts by weight of amorphous silica to 100 parts by weight of an aggregate made of 90-50 wt % of the powder of a refractory raw material such as alumina- or mullite-based material and 10-50 wt % of the fibers of a refractory material such as alumina- or mullite-based material, shaping the mixture, and firing the shaped mixture at 1,450°-1,600° C. However, the lightweight refractory produced by this method has a high alumina content and experiences great thermal expansion. It is therefore unsatisfactory in terms of resistance to spalling and creep.

SUMMARY OF THE INVENTION

An object, therefore, of the present invention is to provide a refractory that is a lightweight and has high strength and which yet exhibits a high degree of heat resistance and durability.

Another object of the present invention is to provide a process for producing such an improved lightweight refractory.

According to the present invention, there is provided a lightweight refractory which is a shaped porous body having refractory particles and aluminous, short fibers bound to each other with mullite, the crystalline structure of said refractory being chiefly composed of mullite and corundum, the mullite content being at least 12 mol % of the sum of mullite and corundum, said refractory being substantially free of free silica.

Also according to the invention, there is provided a process for producing a lightweight refractory comprising the steps of mixing 10-30 wt % of amorphous silica with polycrystalline aluminous short fibers cut to a length of 20-2,000 μm or a mixture thereof with no more than an equal amount of refractory particles, shaping the resulting mixture, and firing the shaped mixture at 1,400°-1,600° C. until it is found to contain no detectable cristobalite.

According to the present invention, a lightweight refractory is a sintered porous body wherein refractory particles, aluminous short fibers cut to a length of no more than 2,000 μm and aluminous continuous fibers cut to a length of 1-40 mm are bound to each other with mullite, the crystalline structure of said refractory being chiefly composed of mullite and corundum, the mullite content being at least 12 mol % of the sum of mullite and corundum, said refractory being substantially free of free silica.

According to another aspect of the invention, a process for producing a lightweight refractory comprises the steps of mixing 10-30 wt % of amorphous silica with polycrystalline aluminous short fibers cut to a length of 20-2,000 μm and polycrystalline aluminous continuous fibers cut to a length of 1-40 mm or a mixture thereof with no more than an equal amount of refractory particles, shaping the resulting mixture, and firing the shaped mixture at 1,400° C.-1,600° C. until it is found to contain no detectable cristobalite.

DETAILED DESCRIPTION OF THE INVENTION

Figure 1:
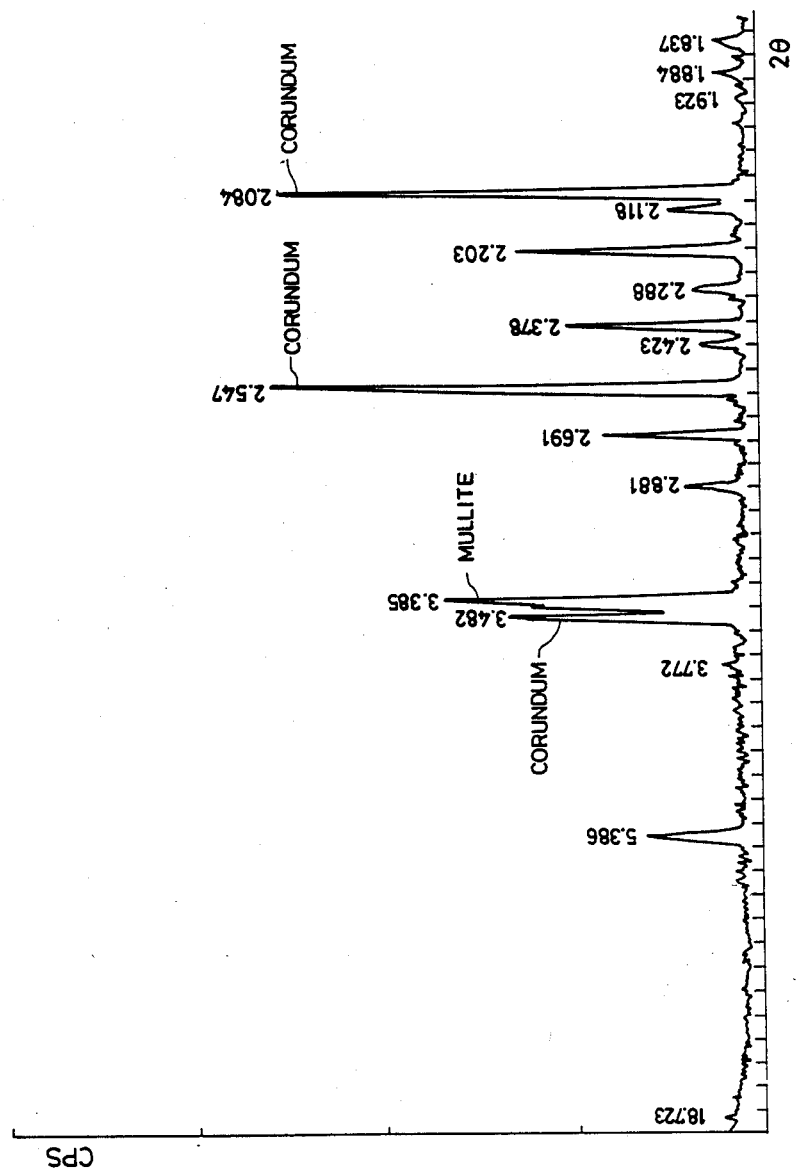
FIG. 1 is a scan of X-ray diffraction showing the crystalline structure of the refractory sample prepared in Example 1.

The lightweight refractory provided by the present invention is a shaped porous body in which refractory particles, aluminous short fibers and optionally continuous aluminous fiber 1-40 mm long are bound to each other with mullite. The crystalline structure of this lightweight refractory is chiefly composed of mullite and corundum and the mullite content is at least 23 wt % of the sum of mullite and corundum. The refractory is substantially free of free silica.

The present invention also provides a particularly advantageous process for producing this lightweight refractory. The process comprises the steps of mixing 10-30 wt % of amorphous silica with polycrystalline aluminous short fibers cut to a length of 20-2,000 μm or a mixture thereof with no more than an equal amount of refractory particles, shaping the resulting mixture, and firing the shaped mixture at 1,400° C.-1,600° C. until it is found to contain no detectable cristobalite.

In the step of firing the shaped body, the surface layer of the polycrystalline aluminous short fibers reacts with the amorphous silica or the crystalline silicacristobalite that results therefrom, thereby producing mullite (3Al$_2$O$_3$.2SiO$_2$) which serves as a binder to impart strength to the shaped body. Compared with the prior art process disclosed in Unexamined Published Japanese patent application No. 88378/84, the process of the present invention is characterized in the following two aspects: first, the polycrystalline aluminous fibers have such short lengths that they can be uniformly mixed with the other raw material ingredients (especially amorphous silica) without the fibers being intertwined with one another; secondly, the fibers and amorphous silica are incorporated in high proportions. The high fiber content contributes to improving the strength of the final product. The content of amorphous silica is increased and it is allowed to react completely with alumina to form mullite. This helps to ensure that alumina content of the final product is reduced enough to improve its heat resistance.

The short polycrystalline aluminous fibers are prepared by cutting with a wet or dry crusher or some other suitable means. Fibers longer than 2,000 μm become intertwined with one another during the mixing step and prevent intimate mixing with other raw material ingredients. If the content of amorphous silica is increased under this situation, the amorphous silica (or the cristobalite resulting therefrom during the firing step) will not react uniformly with the aluminous fibers and part of the silica will remain unreacted (i.e., as cristobalite) in the final product to impair its durability cristobalite itself has good heat resistance but the crystal form that is stable in the higher temperature range (>ca. 250° C.) differs from the crystal form that is stable in the lower temperature range and a volume change occurs as cristobalite shifts from one crystal form to the other; therefore, the existence of cristobalite in a refractory can cause cracking as a result of heating and cooling cycles. If the length of the polycrystalline aluminous short fibers is less than 20 μm, they will be too short to provide satisfactory reinforcing effects. A particularly preferred fiber length is from about 50 to about 500 μm, with the average being about 200 μm.

The polycrystalline aluminous short fibers include within their scope the following: one whose crystalline phase consists of about 95% of α-alumina based $Al_2O_3$ and about 5% $SiO_2$; one whose crystalline phase consists of about 72% of mullite-containing $Al_2O_3$ and about 28% $SiO_2$; one whose crystalline phase consists of about 80% of $Al_2O_3$ having both α-alumina and mullite and about 20% $SiO_2$; and one which is based on the $Al_2O_3$-$SiO_2$-$B_2O_3$ system.

The amorphous silica is used in an amount of 10–30 wt % of the sum of the aluminous short fibers and refractory particles. If the proportion of the amorphous silica is less than 10 wt %, free silica is unlikely to remain in the fired product but the final product obtained is highly aluminous. If the content of amorphous silica exceeds 30 wt %, part of the amorphous silica will remain unreacted (i.e., as cristobalite) in the product even if the aluminous fibers are short enough to achieve uniform mixing and even if firing is effected to a full extent, and this provides a potential cause of poor heat resistance. In consideration of the presence of the alumina or mullite that is introduced in the form of a refractory powder, the content of amorphous silica is desirably controlled such that the weight ratio of total $Al_2O_3$ to $SiO_2$ is in the range of 70:30 to 90:10.

The refractory particles are desirably in the form of a high-purity crystalline powder such as an alumina, mullite or alumina-mullite powder. If necessary, other refractory materials such as coordierite, grog, fireclays and kaolin may also be used in amounts of up to about 5 wt %.

A silica sol may be used as the amorphous silica.

The raw material ingredients described above are mixed in the proportions specified above. Before and after the mixing, a suitable amount of water is added to bring the mixture into a wet or slurried state. The so prepared mixture is shaped by a conventional dehydrative forming method. The shaping is desirably conducted under such conditions that the finally obtained product will have a bulk specific gravity in the range of about 0.5–1.5. When the shaped body is fired at about 1,400° C.–1,600° C. after drying, part of the surface layer of the aluminous short fibers which remain intact reacts with the amorphous silica or the cristobalite that has formed therefrom, whereupon mullite is produced, the remainder being stabilized in the form of corundum. When the firing is continued for about 1–10 hours until all the cristobalite is consumed by this reaction, a product is obtained whose crystalline structure is substantially composed of corundum and mullite, the latter assuming about 12–90 mol % of the product. If the product contains residual cristobalite on account of insufficient firing, it will display the aforementioned defect inherent in cristobalite-containing products. The absence of cristobalite can be verified by standard techniques of powder X-ray diffraction.

In the lightweight refractory of the present invention that is produced by the procedures described above, the corundum-based short fibers having a sufficient length to serve as reinforcement and the refractory particles are bound to each other with mullite at the points of mutual contact, thereby producing a large number of fine pores in the structure of the refractory. A typical and preferred porosity is in the range of about 60–80%. A refractory having a porosity in this range has a bulk specific gravity of 0.5–1.5 and exhibits a heat capacity per volume that is about a half to a sixth of the value for dense alumina-based refractories.

The light-weight refractory of the present invention may immediately be used as the material for firing auxiliaries or ceramic furnace components. It may, as required, be used in such applications after being cut to a suitable shape or furnished with a heat-resistant surface coating (e.g. zirconia coating).

In another aspect, the present invention provides a lightweight refractory which is a porous sintered body wherein short aluminous fibers cut to a length of no more than 2,000 μm, continuous aluminous fibers cut to a length of 1–40 mm and refractory particles are bound to one another with mullite.

The present invention also provides a particularly advantageous process for producing this lightweight refractory. The process comprises the steps of mixing 10–30 wt % of amorphous silica with polycrystalline aluminous short fibers cut to a length of 20–2,000 μm and polycrystalline aluminous continuous fibers cut to a length of 1–40 mm or a mixture thereof with no more than an equal amount of refractory particles, shaping the resulting mixture, and firing the shaped mixture at 1,400° C.–1,600° C. until it is found to contain no detectable cristobalite.

In the step of firing the shaped body, the surface layer of the polycrystalline aluminous fibers reacts with the amorphous silica or the crystalline silica-cristobalite that results therefrom, thereby producing mullite (3Al$_2$O$_3$.2SiO$_2$) which serves as a binder to impart strength to the shaped body. Compared with the prior art process described in Unexamined Published Japanese Patent Application No. 88378/84, the process of the present invention is characterized in the following two aspects: first, part (preferably all) of the polycrystalline aluminous fibers is cut to such short lengths that they can be uniformly mixed with the other raw material ingredients (especially amorphous silica) without the fibers being intertwined with one another; secondly, the fibers and amorphous silica are incorporated in high proportions. The high fiber content contributes to improving the strength of the final product. The content of amorphous silica is increased and it is allowed to react completely with alumina to form mullite. This helps the alumina content of the final product to be sufficiently decreased to improve its heat resistance.

The short polycrystalline aluminous fibers ($\leq 2,000$ $\mu$m) which are used as one ingredient are prepared by cutting the polycrystalline aluminous fibers with a wet or dry crusher or some other suitable means. In spite of using aluminous fibers 1–40 mm long as another ingredient, the short polycrystalline aluminous fibers must not be longer than 2,000 $\mu$m. Containing such short fibers, the fiber mass displays a nature that resembles a powder and mixes well with one other ingredients in powder form. Fibers longer than 2,000 $\mu$m, and especially those having a small diameter, become intertwined with one another during the mixing step and prevent intimate mixing with other ingredients in powder form. If the content of amorphous silica is increased under this situation, the amorphous silica (or the cristobalite resulting therefrom during the firing step) will not react uniformly with the polycrystalline aluminous fibers and part of the silica will remain unreacted (i.e. as cristobalite) in the final product to impair its durability [cristobalite itself has good heat resistance but the crystal form that is stable in the higher temperature range (>ca. 250° C.) differs from the crystal form that is stable in the lower temperature range and a volume change occurs as cristobalite shifts from one crystal form to the other; therefore, the existence of cristobalite in a refractory can cause cracking as a result of heating and cooling cycles]. If the fiber length is too short, it becomes difficult to obtain a product that has a low specific gravity and which exhibits high strength and durability. Therefore, the upper limit for the length of the polycrystalline aluminous short fibers is about 20 $\mu$m. A particularly preferred fiber length is from about 50 to about 500 $\mu$m, with the average being about 200 $\mu$m.

The polycrystalline aluminous continuous fibers which are incorporated as the other fiber component have a length of at least 2 mm, preferably 1–40 mm, with the optimum value being in the range of 2–20 mm. The continuous fibers are chiefly used with the aim of providing product reinforcement, so care must be taken to provide a uniform dispersion of the fibers which are used in a small amount (desirably about 0.5–10 wt % of the sum of all the polycrystalline aluminous fibers and the refractory particles). A preferred fiber length is in the range of 2–20 mm. Use of excessively long fibers or using the fibers in an excess amount will produce an inhomogeneous structure that impairs rather than improves, the physical properties of the product. The polycrystalline aluminous continuous fibers may be identical to the polycrystalline aluminous short fibers ($\leq 2000$ $\mu$m) except for their length. It is, however, more preferable to employ fairly thick (5–20 $\mu$m dia.) continuous fibers since they are resistant to intertwining during the mixing of raw material ingredients and because they impart good formability by serving as a core for the agglomeration of the ingredients in powder form. Particularly suitable fibers for this purpose are continuous filaments cut to short lengths, such as chopped strands (provided they are weakly held together in bundle form so as to permit ready disintegration in discrete fibers). Those which are prepared from continuous filaments are uniform not only in fiber diameter (both within and between monofilaments) but also in fiber length, so a small amount of fibers having optimum properties with suffice to attain satisfactory reinforcement effects.

The polycrystalline aluminous fibers include within their scope the following: one whose crystalline phase consists of about 95% of -alumina based $Al_2O_3$ and about 5% $SiO_2$; one whose crystalline phase consists of about 72% of mullite-containing $Al_2O_3$ and about 28% $SiO_2$; one whose crystalline phase consists of about 80% of $Al_2O_3$ having both -alumina and mullite and about 20% $SiO_2$; and one which is based on the $Al_2O_3$-$SiO_2$-$B_2O_3$ system.

For the reasons which will be stated in Examples 1–5 to be given later in this specification, the amorphous silica is used in an amount of 10–30 wt % of the sum of the polycrystalline aluminous fibers and the refractory particles.

The refractory particles are desirably in the form of a high-purity crystalline powder such as an alumina, mullite or alumina-mullite powder. These powders are desirably used in amounts ranging from 5 to 100 parts by weight per 100 parts by weight of the polycrystalline aluminous fibers. If necessary, other refractory materials such as cordierite, grog, fireclays and kaolin may also be used in amounts of up to about 5 wt %.

The raw material ingredients described above are mixed in the proportions specified above. Before and after the mixing, a suitable amount of water is added to bring the mixture into a wet or slurried state. The so prepared mixture is shaped by a conventional dehydrative forming method. The shaping is desirably conducted under such conditions that the finally obtained product will have a bulk specific gravity in the range of about 0.5–1.5. When the shaped body is fired at about 1,400° C.–1,600° C. after drying, part of the surface layer of the polycrystalline aluminous fibers which remain intact reacts with the amorphous silica or the cristobalite that has formed therefrom, whereupon mullite is produced, with the remainder being stabilized in the form of corundum. If the firing is continued for about 1–10 hours until all the cristobalite is consumed by this reaction, a product is obtained whose crystalline structure is substantially composed of corundum and mullite, the latter assuming about 12–90 mol % of the product. If the product contains residual cristobalite on account of insufficient firing, it will display the aforementioned defect inherent in cristobalite-containing products. The absence of cristobalite can be verified by standard techniques of powder X-ray diffraction.

In the lightweight refractory of the present invention produced by the procedures described above, the following three components, i.e., the corundum-based fibers that are short ($\leq 2,000$ $\mu$m) but which yet retain a fiber form, the longer corundum-based fibers which produce excellent reinforcement effects and the refractory particles, are bound to each other with mullite at the points of mutual contact, thereby producing a large number of fine pores in the structure of the refractory. A typical and preferred porosity is in the range of about 50–80%. A refractory having a porosity in this range has a bulk specific gravity of 0.5–1.5 and exhibits a heat capacity per unit of volume that is about a half to a sixth of the value for dense alumina-based refractories.

The lightweight refractory of the present invention may immediately be used as the material for firing auxiliaries or ceramic furnace components. It may, as required, be used in such applications after being cut to a suitable shape or furnished with a heat-resistant surface coating (e.g. zirconia coating).

The lightweight refractory produced by either of the two methods of the present invention contains a large amount of mullite having better thermal properties than alumina and is substantially free from free silica. Although this refractory is prepared from aluminous fibers, it exhibits much higher durability than any of the prior art highly aluminous lightweight refractories. The efficiency of reinforcement with the aluminous fibers cut to short lengths is so high that products can be readily obtained that have a bulk specific gravity of about 1.0 or below and which yet exhibit degrees of strength that are eminently satisfactory for practical purposes. Furthermore, the products can be easily cut to a desired shape.

EXAMPLES 1-5 AND COMPARATIVE values given in Table 1 were obtained by measurement in accordance with the following test procedures.

Flexural strength: Using a test piece 6 mm thick, 25 mm wide and 75 mm long, measurements were conducted with a span of 50 mm at a load speed of 0.2 mm/min either at ambient temperature or at 1,400° C.

Spalling resistance: A test piece 6 mm thick, 200 mm wide and 200 mm long was placed in a furnace (600° C.), heated for 1 hour and thereafter cooled with air. If no crack was found, up to 30 thermal shock cycles were run by the same procedures.

Creep resistance: A test piece 6 mm thick, 200 mm wide and 200 mm long was supported at its four corners on supports having a supporting surface area of 15 mm $\times$ 15 mm and a height of 20 mm. Loads (3 kg) were placed on the test piece in such a way that they were uniformly distributed. The test piece was set in a furnace (1,400° C.) and heated for 24 hours, followed by measurements of maximum deflection in the test piece.

TABLE 1

| | Raw material ingredients (parts by weight) | | | Firing tempera- ture (°C.) | Crystalline structure of the product (mol %) | | | bulk specific gravity | flexural strength (kg/cm²) | | spal- ling resis- tance *1 | creep resis- tance *2 |
|---|---|---|---|---|---|---|---|---|---|---|---|---|
| Sample | aluminous fiber | sintered alumina | silica sol | | Corun- dum | mul- lite | cris- tobal- ite | | abient temper- ature | 1,400° C. | | |
| Comparative Example | | | | | | | | | | | | |
| 1 | untreated (30) | 70 | 5 | 1,500 | 95.0 | 5.0 | — | 0.89 | 94 | 32 | 1 | 3.2 |
| 2 | untreated (30) | 70 | 5 | 1,600 | 93.7 | 6.3 | — | 0.92 | 102 | 38 | 1 | 3.1 |
| 3 | untreated (30) | 70 | 20 | 1,500 | 62.6 | 6.4 | 30.9 | 0.93 | 124 | 53 | 1 | 0.7 |
| 4 | untreated (70) | 30 | 20 | 1,500 | 64.2 | 17.8 | 18.0 | 0.62 | 60 | 28 | >30 | 4.5 |
| 5 | treated (30) | 70 | 20 | 1,500 | 70.3 | 20.8 | 8.9 | 1.10 | 162 | 71 | 1 | 0.5 |
| 6 | treated (70) | 30 | 5 | 1,500 | 92.3 | 7.2 | — | 0.88 | 102 | 41 | 12 | 2.7 |
| 7 | treated (70) | 30 | 5 | 1,600 | 91.2 | 8.8 | — | 0.94 | 115 | 45 | 14 | 2.5 |
| 8 | treated (70) | 30 | 40 | 1,500 | — | 75.8 | 24.2 | 1.02 | 156 | 65 | 3 | 2.3 |
| Example | | | | | | | | | | | | |
| 1 | treated (70) | 30 | 20 | 1,500 | 64.2 | 35.8 | — | 0.90 | 142 | 83 | >30 | 0.2 |
| 2 | treated (100) | 0 | 20 | 1,500 | 59.2 | 40.8 | — | 0.81 | 102 | 54 | >30 | 1.3 |
| 3 | treated (50) | 50 | 20 | 1,500 | 67.6 | 32.4 | — | 0.97 | 151 | 92 | 21 | 0.1 |
| 4 | treated (70) | 30 | 10 | 1,500 | 84.3 | 15.7 | — | 0.86 | 117 | 63 | >30 | 1.1 |
| 5 | treated (70) | 30 | 30 | 1,500 | 26.5 | 73.5 | — | 0.98 | 148 | 81 | 24 | 0.5 |

*1 Heating cycle times to cracking;
*2 amount of deflection (mm)

EXAMPLES 1-8

The following examples and comparative examples are provided for the purpose of further illustrating the present invention but are not to be taken as limiting. In these examples, the following raw material ingredients were employed:

Polycrystalline aluminous fibers: fiber diameter, 3 $\mu$m; average fiber length, 50 mm; $Al_2O_3$ content 95%.

These fibers were "treated" by disintegrating and cutting them with a pulper to fiber lengths of about 50-500 $\mu$m.

Refractory powder: sintered alumina.

Amorphous silica: silica sol.

The process proceeded as follows: The polycrystalline aluminous fibers and refractory powder were dispersed in water. After addition of amorphous silica, the mixture was stirred, dehydrated by suction and shaped. The shaped body was dried with hot air and fired for 3 hours at 1,500° C.-1,600° C.

A series of experiments were run with the proportions of raw material ingredients and the treatment conditions being changed as shown in Table 1. The results are also shown in Table 1. The characteristic

EXAMPLES 6-8 AND COMPARATIVE EXAMPLES 9-14

The following additional examples and comparative examples are provided for the purpose of further illustrating the present invention but are not to be taken as limiting. In these examples, the following raw material ingredients were employed:

Polycrystalline aluminous fibers: "Untreated" fibers: fiber diameter, 3 $\mu$m; average fiber length, ca. 50 mm, 95% $Al_2O_3$; 5% $SiO_2$ "Very short" Fibers: The "untreated" fibers were disintegrated and cut with a pulper to fiber lengths of about 50-500 $\mu$m.

Reinforcement fibers: $Al_2O_3$-$B_2O_3$-$SiO_2$ polycrystalline aluminous fibers chopped strands consisting of 68% $Al_2O_3$; 27% $SiO_2$; and 5% $B_2O_3$; monofilament diameter, 15 $\mu$m; length, 10 mm except in Comparative Example 14 (1 mm) and Comparative Example 15 (30 mm).

Using these ingredients, lightweight refractory samples were produced as in Examples 1-5.

A series of experiments were run with the proportions of raw material ingredients and the treatment conditions being varied as shown in Table 2. The results are also shown in Table 2. The characteristic values given in Table 1 were obtained by measurements conducted in accordance with the same test procedures as employed in Examples 1–5 and Comparative Examples 1–8.

TABLE 2

| Sample | Aluminous fiber (parts by weight) untreated fibers | very short fibers | reinforcement fibers | Sintered alumina (parts by weight) | Silica sol (parts by weight) | Bulk specific gravity | Flexural Strength (kg/cm$^2$) ambient temperature | 1,400° C. | Spalling resistance 600° C. | 700° C. | 800° C. |
|---|---|---|---|---|---|---|---|---|---|---|---|
| Example | | | | | | | | | | | |
| 6 | | 70 | 2.5 | 30 | 20 | 0.90 | 138 | 79 | >30 | >30 | 21 |
| 7 | | 50 | 5 | 50 | 20 | 0.94 | 155 | 88 | >30 | >30 | 12 |
| 8 | | 90 | 2.5 | 10 | 20 | 0.85 | 94 | 40 | >30 | >30 | >30 |
| Comparative Example | | | | | | | | | | | |
| 9 | 30 | | | 70 | 5 | 0.83 | 94 | 32 | 1 | — | — |
| 10 | | 30 | | 70 | 20 | 1.10 | 162 | 71 | 1 | — | — |
| 11 | | 30 | 10 | 70 | 20 | 0.95 | 122 | 58 | 3 | — | — |
| 12 | | 70 | 15 | 30 | 20 | 0.50 | 42 | 19 | >30 | >30 | >30 |
| 13 | | 70 | 10 (0.5 mm) | 30 | 20 | 0.85 | 95 | 35 | >30 | 13 | 1 |
| 14 | | 70 | 5 (50 mm) | 30 | 20 | 0.70 | 62 | 23 | 24 | 5 | 1 |

Figure 2:
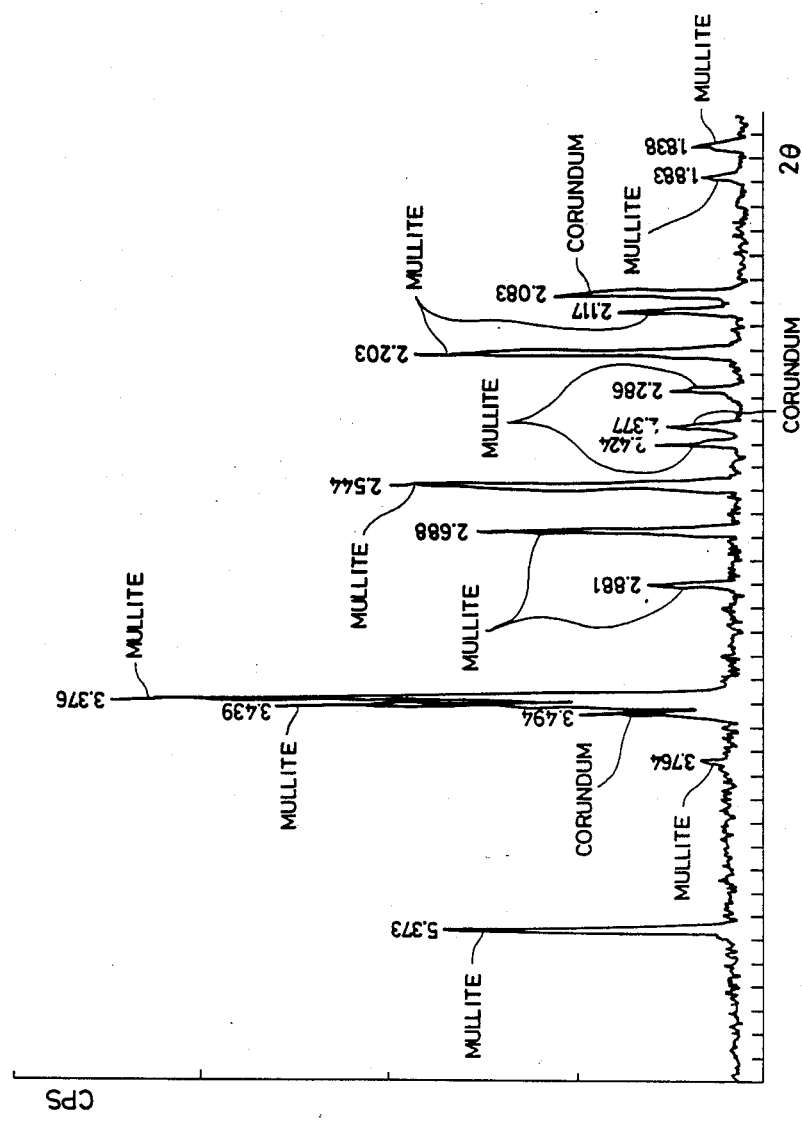
FIG. 2 is a scan of X-ray diffraction showing the crystalline structure of the refractory sample prepared in Example 6.
Figure 3:
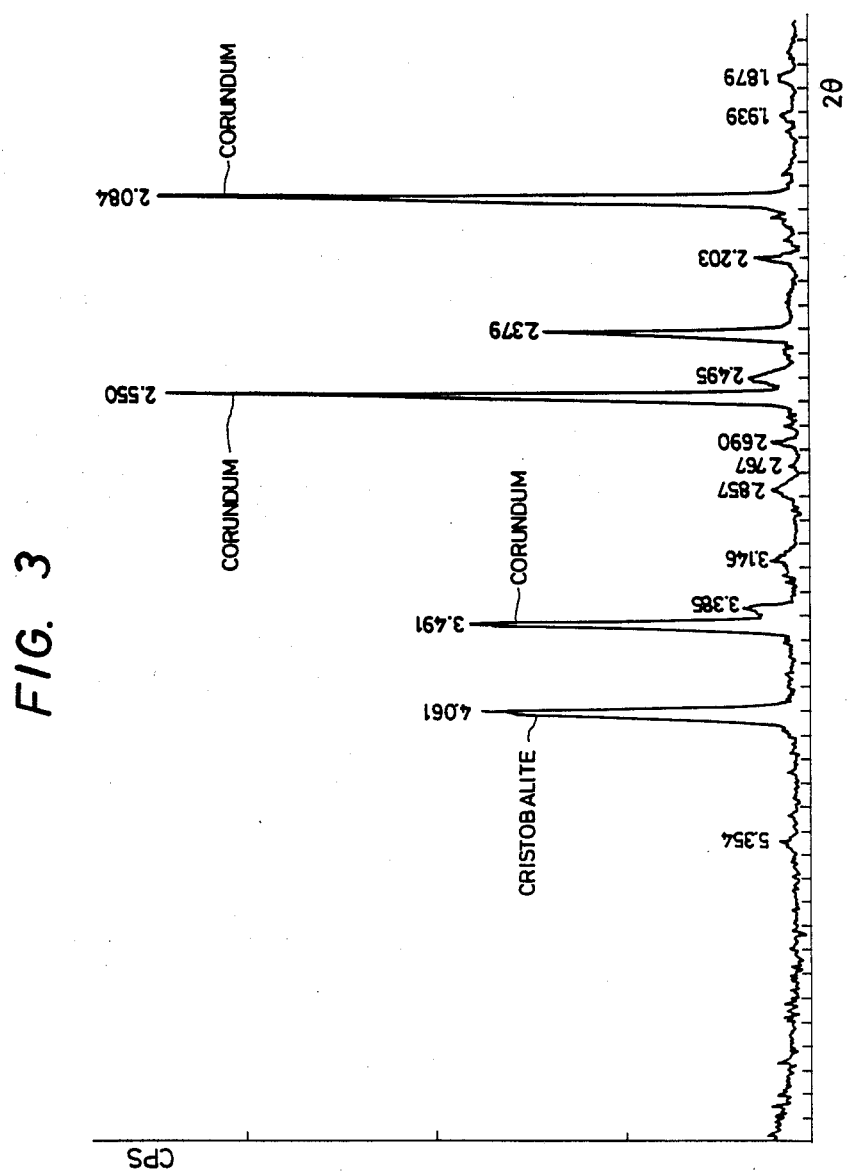
FIG. 3 is a scan of X-ray diffraction showing the crystalline structure of the refractory sample prepared in Comparative Example 3.

The crystalline structures of the samples prepared in Examples 1, 6 and Comparative Example 3 are shown in scans of X-ray diffraction in FIGS. 1, 2 and 3, respectively.

We claim:

1. A lightweight refractory which is a shaped porous body having refractory particles and aluminous short fibers bound to each other with mullite, the crystalline structure of said refractory being chiefly composed of mullite and corundum, the mullite content being at least 12 mol % of the sum of mullite and corundum, said refractory being substantially free of free silica and having a bulk specific gravity of 0.5–1.5.

2. A lightweight refractory according to claim 1 wherein said refractory particles are selected from the group consisting of alumina, mullite or alumina-mullite.

3. A process for producing a lightweight refractory comprising the steps of mixing 10–30 wt % of amorphous silica with polycrystalline aluminous short fibers cut to a length of 20–2,000 μm or a mixture thereof with no more than an equal amount of refractory particles, shaping the resulting mixture, and firing the shaped mixture at 1,400°–1,600° C. until it is found to contain no detectable cristobalite.

4. A process according to claim 3 wherein said refractory particles are selected from the group consisting of alumina, mullite or alumina-mullite.

5. A lightweight refractory which is a shaped porous body wherein refractory particles, aluminous short fibers cut to a length of no more than 2000 μm and aluminous continuous fibers cut to a length of 1–40 mm are bound to each other with mullite, the crystalline structure of said refractory being chiefly composed of mullite and corundum, the mullite content being at least 12 mol % of the sum of mullite and corundum, said refractory being substantially free of free silica and having a bulk specific gravity of 0.5–0.5.

6. A process for producing a lightweight refractory comprising the steps of mixing 10–30 wt % of amorphous silica with polycrystalline aluminous short fibers cut to a length of 20–2,000 μm and polycrystalline aluminuous continuous fibers cut to a length of 1–40 mm or a mixture thereof with no more than an equal amount of refractory particles, shaping the resulting mixture, and firing the shaped mixture at 1,400°–1,600° C. until it is found to contain no detectable cristobalite.

7. A process according to claim 6 wherein said refractory particles are those of alumina, mullite or alumina-mullite.

8. A process according to claim 6 wherein the polycrystalline aluminous continuous fibers are used in amounts of 0.5–10 wt % of the sum of all the polycrystalline aluminous fibers and the refractory particles.

9. A process according to claim 6 wherein the polycrystalline aluminous continuous fibers have a length of 2–20 mm and a diameter of 5–20 μm.

10. A process according to claim 6 wherein the polycrystalline aluminous continuous fibers are cut from continuous filaments.

* * * * *

UNITED STATES PATENT AND TRADEMARK OFFICE
CERTIFICATE OF CORRECTION

PATENT NO. : 4,849,382
DATED : July 18, 1989
INVENTOR(S) : SHIBATA et al

It is certified that error appears in the above-identified patent and that said Letters Patent is hereby corrected as shown below:

In the Claims

Column 10, line 30, change "0.5-0.5" to -- 0.5-1.5 --.

Signed and Sealed this

Twenty-sixth Day of May, 1992

Attest:

DOUGLAS B. COMER

Attesting Officer

Acting Commissioner of Patents and Trademarks